(12) United States Patent
Yoshida (10) Patent No.: US 6,307,590 B1
(45) Date of Patent: Oct. 23, 2001

(54) COOLED CCD CAMERA

(75) Inventor: Koji Yoshida, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/006,836

(22) Filed: Jan. 14, 1998

(30) Foreign Application Priority Data

Jan. 30, 1997 (JP) .................................................. 9-017169

(51) Int. Cl.$^7$ .................................................. H04N 5/225
(52) U.S. Cl. ..................... 348/340; 348/374; 359/507
(58) Field of Search ................................. 348/207, 243, 348/244, 335, 340, 373, 374, 375; 359/507, 509, 511, 513, 514; 257/434, 666, 680; 65/29.12; H04N 5/225

(56) References Cited

U.S. PATENT DOCUMENTS

| | | | |
|---|---|---|---|
| 4,594,613 | * 6/1986 | Shinbori et al. | 348/340 |
| 5,508,740 | * 4/1996 | Miyaguchi et al. | 348/244 |
| 5,534,725 | * 7/1996 | Hur | 257/434 |
| 5,855,637 | * 1/1999 | Yakou et al. | 65/29.12 |
| 6,078,359 | * 6/2000 | Conder | 348/374 |

* cited by examiner

*Primary Examiner*—Tuan Ho
(74) *Attorney, Agent, or Firm*—Sughrue, Mion, Zinn, Macpeak & Seas, PLLC (57) ABSTRACT

A cooled CCD camera includes a CCD, a heat transfer plate, a cooling element for cooling the CCD, at least one substrate on which electronic parts are mounted and an airtight package for accommodating them, the package being made of aluminum alloy, an optical glass plate being airtightly mounted on the package by sealing with glass having a melting point from 400 to 450° C. and connector terminals for connecting the CCD to the outside being airtightly mounted on the package by sealing with glass having a melting point from 400 to 450° C. The thus constituted cooled CCD camera has simple structure, is easy to mount and has improved cooling efficiency.

2 Claims, 7 Drawing Sheets

COOLED CCD CAMERA

BACKGROUND OF THE INVENTION

The present invention relates to a cooled CCD (Charge Coupled Device) camera and, particularly, to such a cooled CCD camera of simple structure that is easy to mount and has improved cooling efficiency.

DESCRIPTION OF THE PRIOR ART

A chemiluminescent detecting system is known, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information.

Further, a fluorescence system using a fluorescent substance as a labeling substance is known. According to this system, it is possible to study a genetic sequence, the expression level of a gene and the metabolism, absorption, excretion path and state of a substance introduced into a test mouse and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing fluorescent dye or dipping a gel support on which a plurality of DNA fragments have been distributed by means of electrophoresis in a solution containing fluorescent dye, thereby labeling the electrophoresis-distributed DNA fragments, exciting the fluorescent dye by a stimulating ray to cause it to release a fluorescent light, detecting the released fluorescent light to produce an image and detecting the distribution of the DNA on the gel support. This system can also perform a process including the steps of distributing a plurality of DNA fragments on a gel support by means of electrophoresis, denaturing the DNA, transferring at least a part of the denatured DNA fragments onto a transfer support such as a nitrocellulose support by the Southern-blotting method, hybridizing a probe prepared by labeling target DNA and DNA or RNA 15 complementary thereto with the denatured DNA fragments, thereby selectively labeling only the DNA fragments complementary to the probe DNA or probe RNA, exciting the fluorescent dye by a stimulating ray to cause it to release a fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substrate, transforming the fluorescent substrate to a fluorescent substance having a fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

In the case where such chemiluminescent emission or fluorescent light is detected by a cooled CCD camera to produce a chemiluminescent image or a fluorescent image, since chemiluminescent emission or fluorescent light is very weak, the cooled CCD camera has to be exposed thereto for a long time. However, it is known that when the cooled CCD camera is exposed for a long time, noise is generated in the image by heat emitted from the CCD. Therefore, for reducing noise in the image caused by heat generated by the CCD, the cooled CCD camera for detecting very weak light such as chemiluminescent emission or fluorescent light is constituted by providing the CCD, a heat transfer plate made of a metal, a cooling element for cooling the CCD and a substrate on which electronic parts are mounted within an airtight package.

A conventional airtight metal package is made of stainless steel, Kovar or the like from the viewpoint of workability. Therefore, the heat transfer coefficient is low and the efficiency of heat dispersion and heat transfer is insufficient and drop-like condensation occurs on the light incident window, which is made of optical glass or the like and mounted on the package. Accordingly, a heater is provided in a conventional cooled CCD camera for preventing the drop-like condensation.

However, not only complicates the structure and increases a cost but also degrades the cooling efficiency, provision of an additional means such as a heater.

SUMMARY OF THE INVENTION

It is therefore an object of the present invention to provide a cooled CCD camera of simple structure that is easy to mount and has improved cooling efficiency.

The above and other objects of the present invention can be accomplished by a cooled CCD camera comprising a CCD, a heat transfer plate, a cooling element for cooling the CCD, a substrate on which electronic parts are mounted and an airtight package for accommodating them, the package being made of aluminum alloy, an optical glass plate being airtightly mounted on the package by sealing with glass having a melting point from 400 to 450° C. and connector terminals for connecting the CCD to the outside being airtightly mounted on the package by sealing with glass having a melting point from 400 to 450° C.

The aluminum alloy has a much higher heat transfer coefficient than that of stainless steel, Kovar or the like but is hard to process by welding. In particular, a high temperature is required when a connector terminal to the outside is airtightly mounted by welding, thereby increasing the risk of damage to the CCD and the electronic parts. On the other hand, it is extremely difficult to airtightly mount the connector terminal by means of vacuum brazing. Therefore, aluminum alloy has seldom been employed as the material for the airtight package of a cooled CCD camera.

However, according to the present invention, the optical glass plate forming a light incident window and the connector terminals for connecting to the outside are airtightly mounted on the package by sealing with glass having a low melting point from 400 to 450° C. Therefore, since the airtight package of the cooled CCD camera can be formed by aluminum alloy having a much higher heat transfer coefficient than that of the material of the conventional airtight package such as stainless steel and Kovar, the cooling efficiency can be markedly improved, thereby preventing drop-like condensation on the optical glass plate without any additional means such as a heater and, therefore, the structure of the cooled CCD camera can be simplified. Further, since the optical glass plate and the connector terminals connecting the CCD to the outside can be airtightly mounted on the package without need for high-temperature welding or vacuum brazing, the cooled CCD camera can be easily assembled.

The above and other objects and features of the present invention will become apparent from the following description made with reference to the accompanying drawings.

DESCRIPTION OF THE PREFERRED EMBODIMENT

Figure 1:
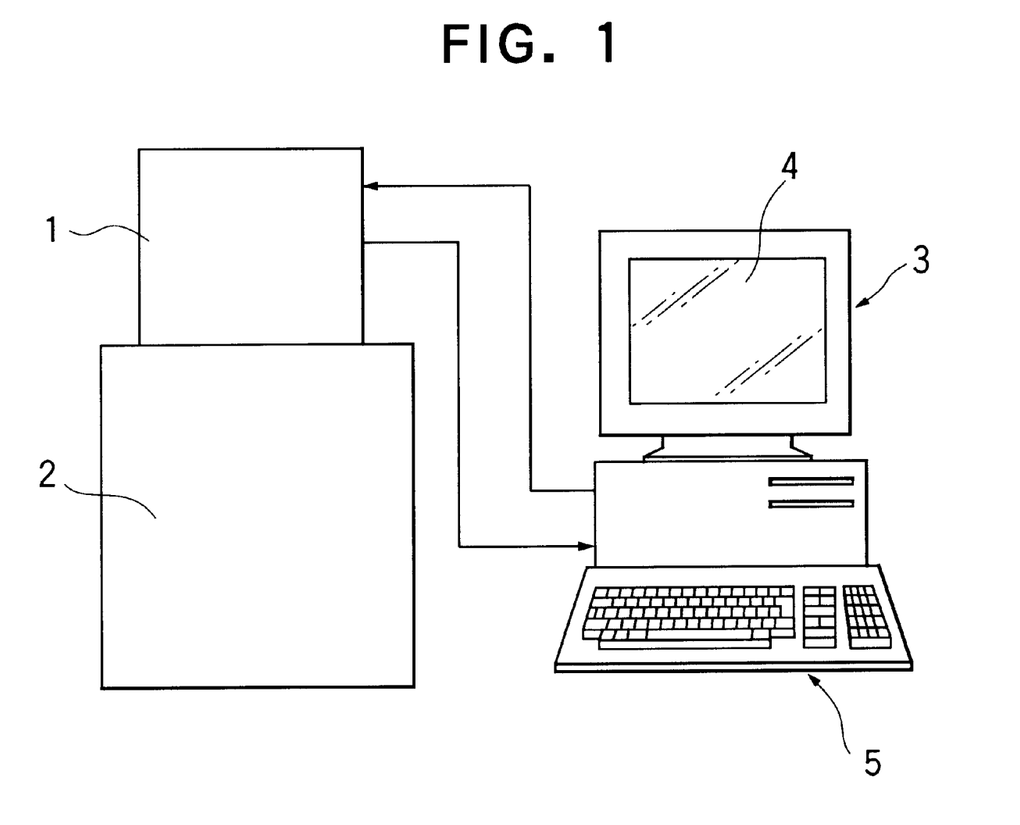
FIG. 1 is a schematic front view showing an image producing apparatus including a cooled CCD camera which is an embodiment of the present invention.

As shown in FIG. 1, an image producing apparatus includes an imaging device 1, a dark box 2 and a personal computer 3. The personal computer 3 is equipped with a CRT display 4 and a keyboard 5.

Figure 2:
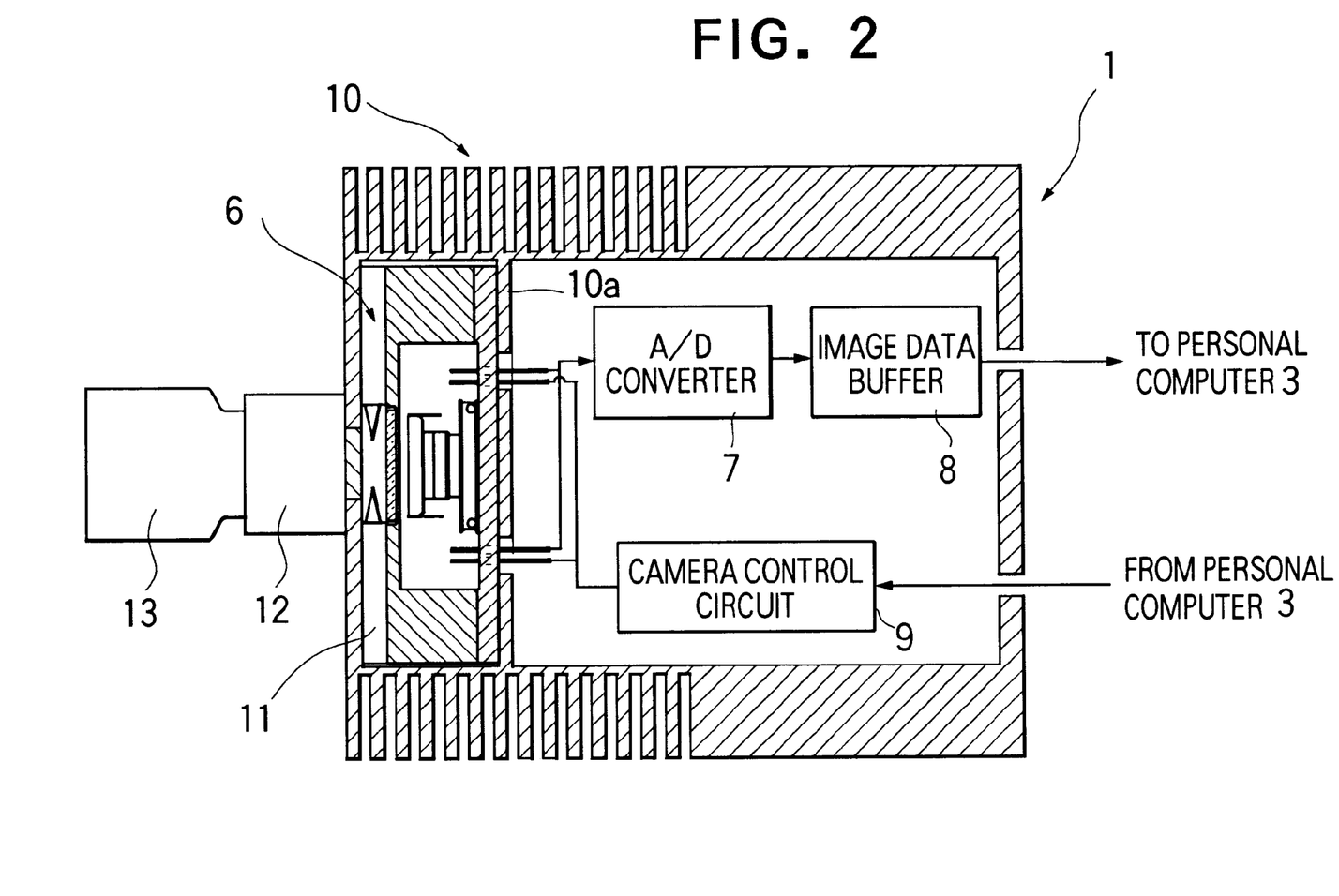
FIG. 2 is a schematic longitudinal cross sectional view showing an imaging device.

FIG. 2 is a schematic longitudinal cross sectional view showing the imaging device 1.

As shown in FIG. 2, the imaging device 1 includes a cooled CCD camera 6, an A/D converter 7 for converting analog image data produced by the cooled CCD camera 6 to digital image data, an image data buffer 8 for temporarily storing image data digitized by the A/D converter 7 and a camera controlling circuit 9 for controlling the operation of the imaging device 1. The periphery of the imaging device 1 is formed with heat dispersion fins 10 over substantially half its length for dispersing heat. The cooled CCD camera 6 is intimately fixed onto the wall surface 10a of the heat dispersion fins 10 so that heat generated by the cooled CCD camera 6 can be dispersed.

A shutter 11 is provided in front of the cooled CCD camera 6 mounted on the imaging device 1. An image intensifier 12 disposed in the dark box 2 is provided in front of the imaging device 1 and a camera lens 13 is mounted on the front surface of the image intensifier 12.

Figure 3:
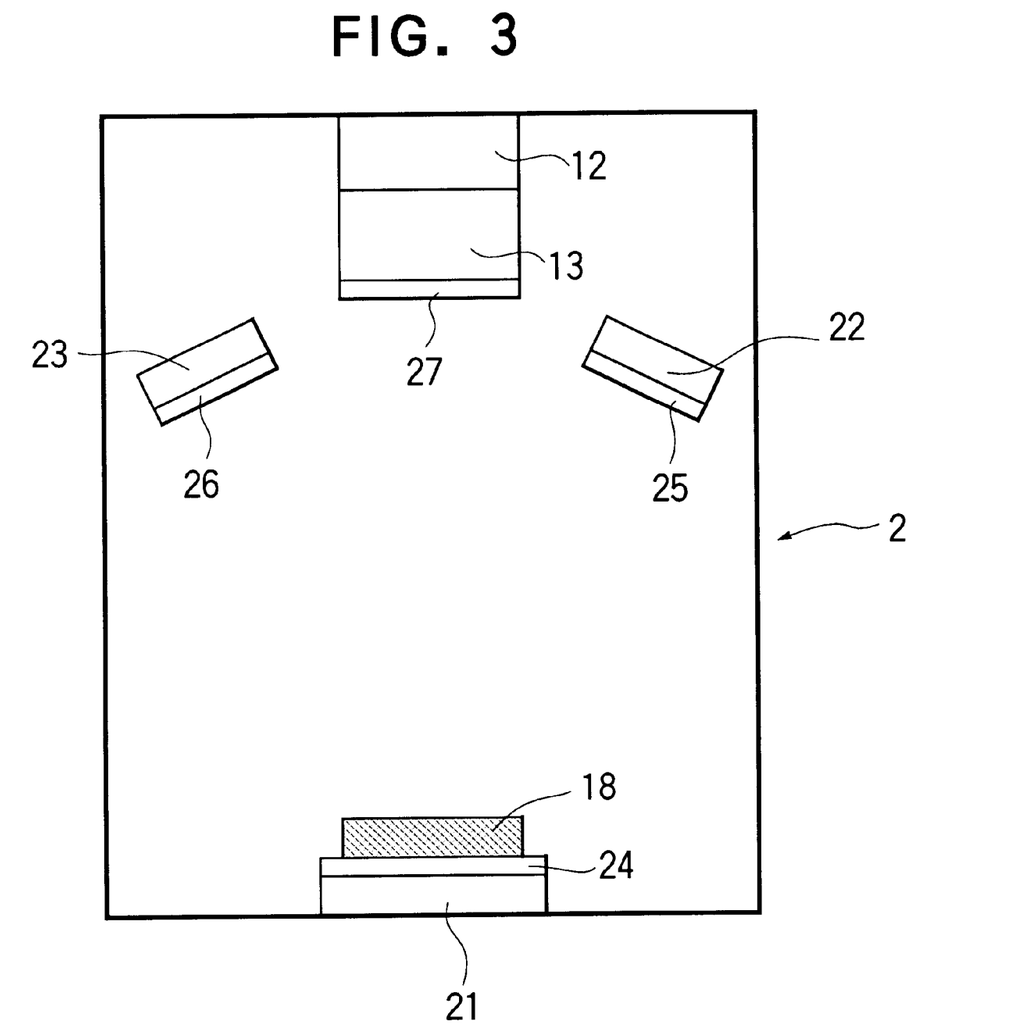
FIG. 3 is a schematic vertical cross sectional view showing a dark box.

FIG. 3 is a schematic longitudinal cross sectional view of the dark box 2.

As shown in FIG. 3, the dark box 2 is equipped with a first blue light emitting diode stimulating ray source 21 for emitting a stimulating ray whose center wavelength is 450 nm, and a second blue light emitting diode stimulating ray source 22 and a third blue light emitting diode stimulating ray source 23 are provided obliquely above the first blue light emitting diode stimulating ray source 21, each being adapted for emitting a stimulating ray whose center wavelength is 450 nm. A filter 24 is adhered to the upper surface of the first blue light emitting diode stimulating ray source 21 and filters 25, 26 are respectively adhered to the front surfaces of the second blue light emitting diode stimulating ray source 22 and the third blue light emitting diode stimulating ray source 23. The filters 24, 25, 26 cut light of wavelengths other than one in the vicinity of 450 nm and harmful to the stimulation of a fluorescent substance and transmit light having a wavelength in the vicinity of 450 nm. A filter 27 for cutting the stimulating ray having a wavelength in the vicinity of 450 nm is detachably provided on the front surface of the camera lens 13.

Figure 4:
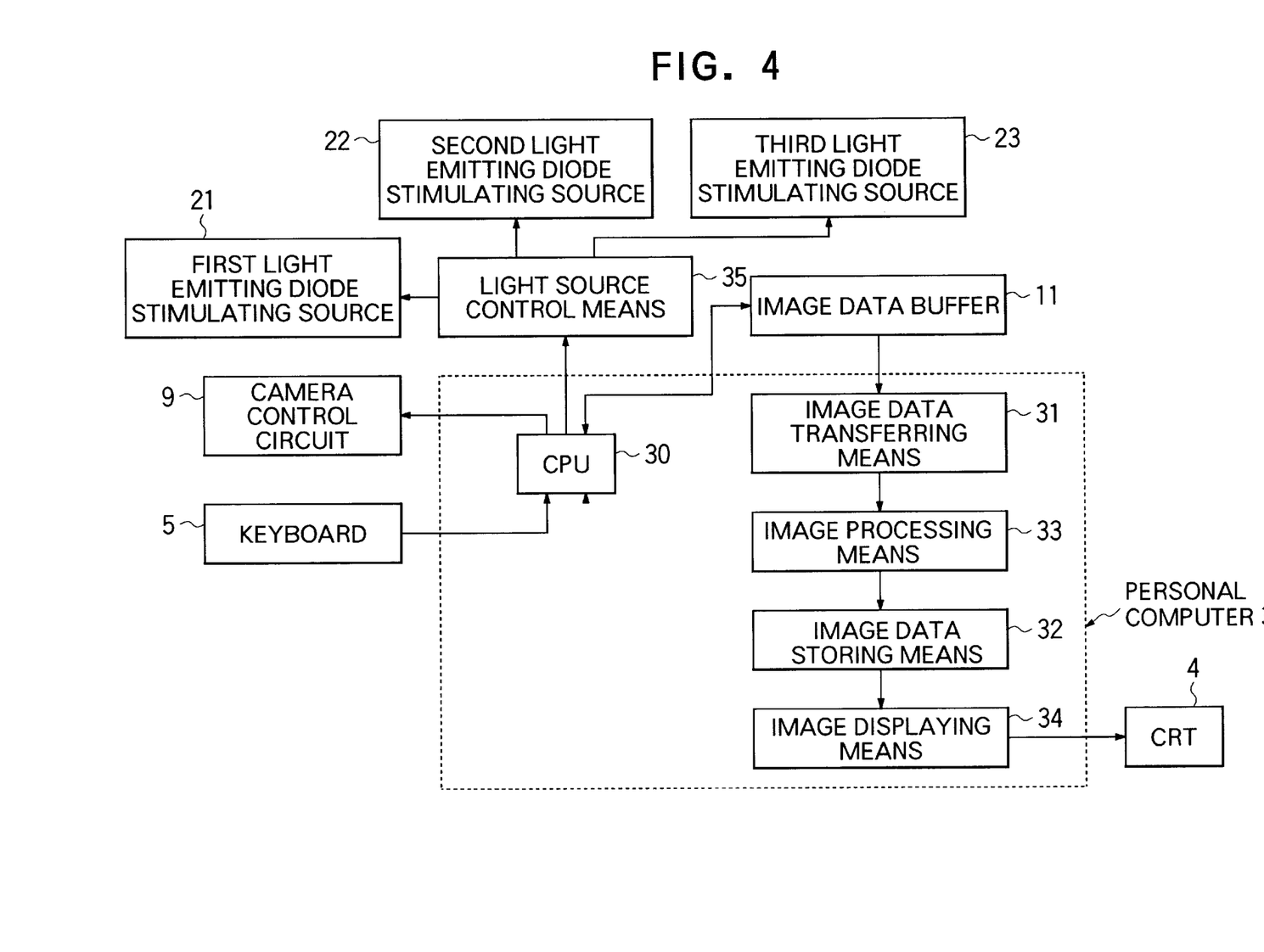
FIG. 4 is a block diagram of a personal computer and peripheral devices thereof.

FIG. 4 is a block diagram of the personal computer 3 and the peripheral devices thereof.

As shown in FIG. 4, the personal computer 3 includes a CPU 30 for controlling the exposure of the imaging device 1, an image data transferring means 31 for reading the image data produced by the imaging device 1 from the image data buffer 8, an image processing means 33 for effecting image processing on the image data read out by the image data transferring means 31 and storing them in an image data storing means 32, and an image displaying means 34 for displaying a visual image on the screen of the CRT display 4 based on the image data stored in the image data storing means 32. The first blue light emitting diode stimulating ray source 21, the second blue light emitting diode stimulating ray source 22 and the third blue light emitting diode stimulating ray source 23 are controlled by a light source control means 35 and an instruction signal can be input via the CPU 30 to the light source control means 36 through the keyboard 5. The CPU 30 is constituted so as to output various signals to the camera controlling circuit 9 of the imaging device 1.

Figure 5:
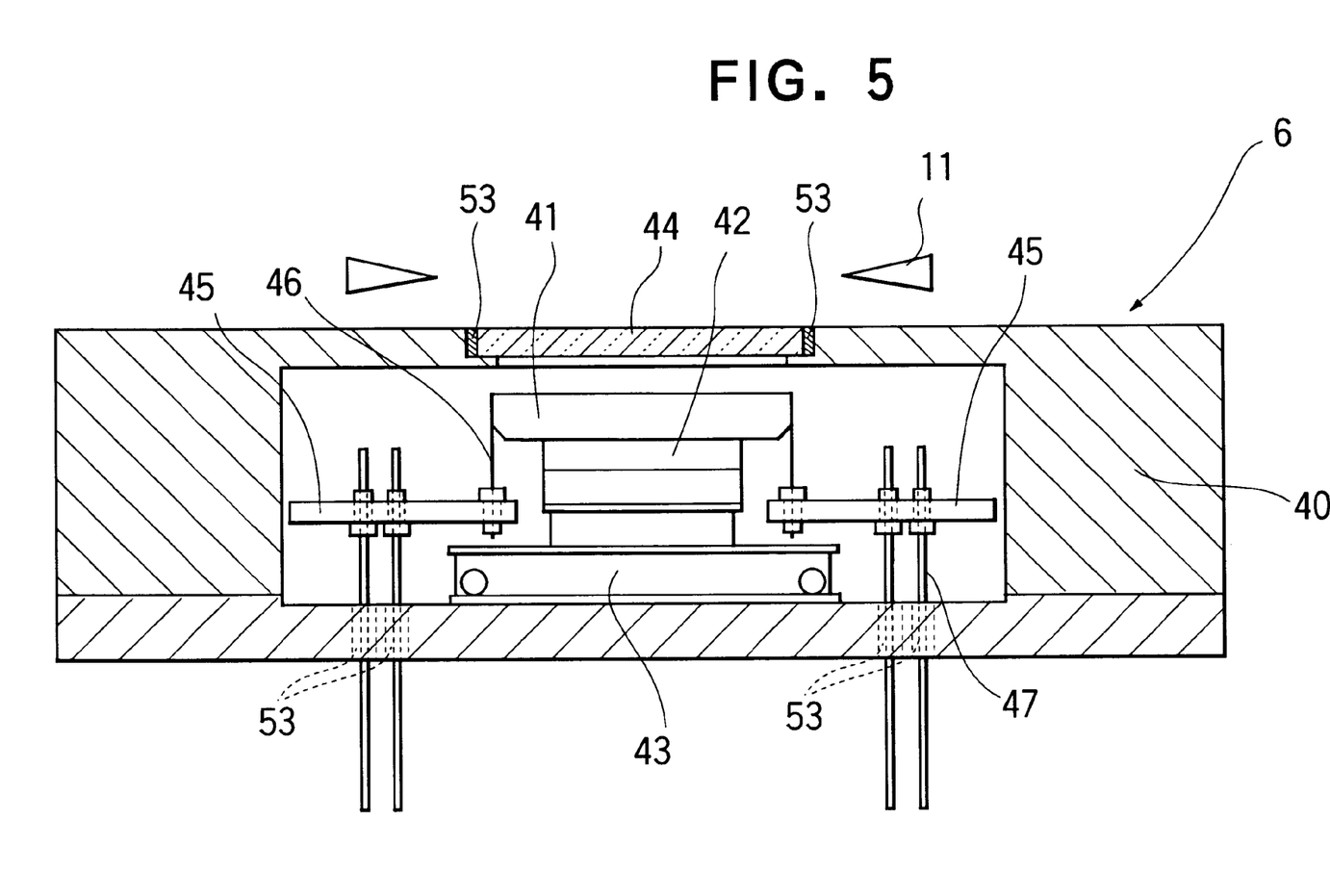
FIG. 5 is a schematic longitudinal cross sectional view showing the details of a cooled CCD camera.

FIG. 5 is a schematic longitudinal cross sectional view showing the details of a cooled CCD camera.

As shown in FIG. 5, the cooled CCD camera 6 includes an airtight package 40 made of aluminum alloy and further includes, in the package 40, a CCD 41, a heat transfer plate 42 made of a metal such as aluminum alloy, a Peltier element 43 for cooling the CCD 41, an optical glass plate 44 forming a light incident window mounted on the package 40 on the side of the camera lens 13 with respect to the CCD 41 and substrates 45 on which electronic parts are mounted.

The terminals 46 of the CCD 41 are connected via sockets described later to predetermined portions of the substrates 45 and the connector terminals 47 for connecting the CCD 41 to the outside are connected via the same sockets described later to predetermined portions of the substrates 45. The portions between the connector terminals 47 and the package 40 and between the optical glass 44 and the package 40 are all hermetically sealed by glass 53 having a low melting point from 400 to 450° C.

Figure 6:
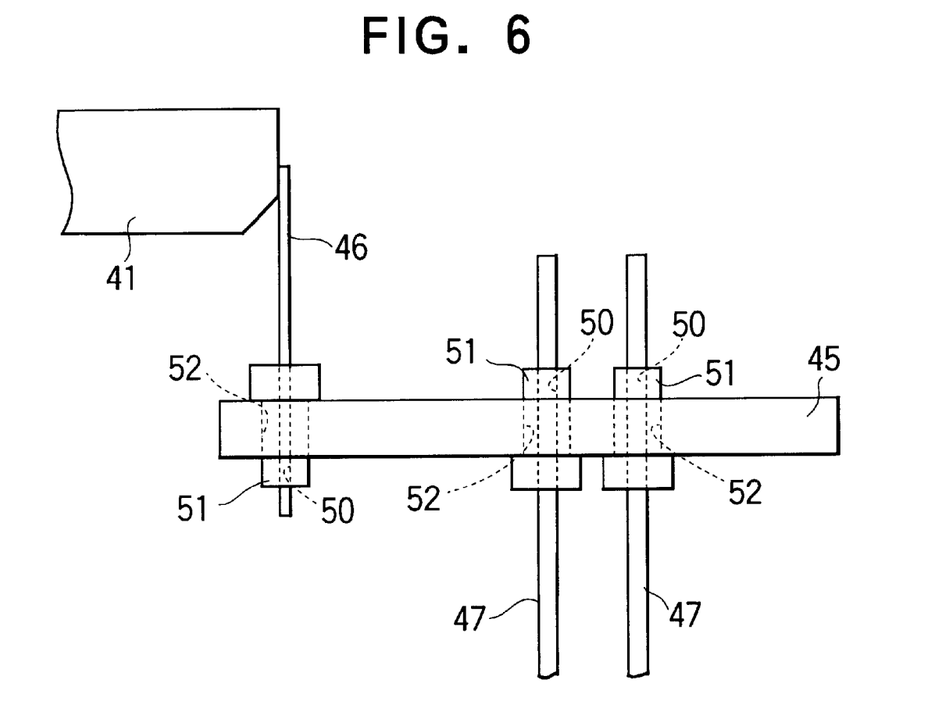
FIG. 6 is a schematic side view showing the connection between the terminal of a CCD and a substrate, and between connector terminals and the substrate.

FIG. 6 is a schematic side view showing the connection between one of the terminals 46 of the CCD 41 and the substrate 45 and between one set of the connector terminals 47 and the substrate 45.

Figure 7:
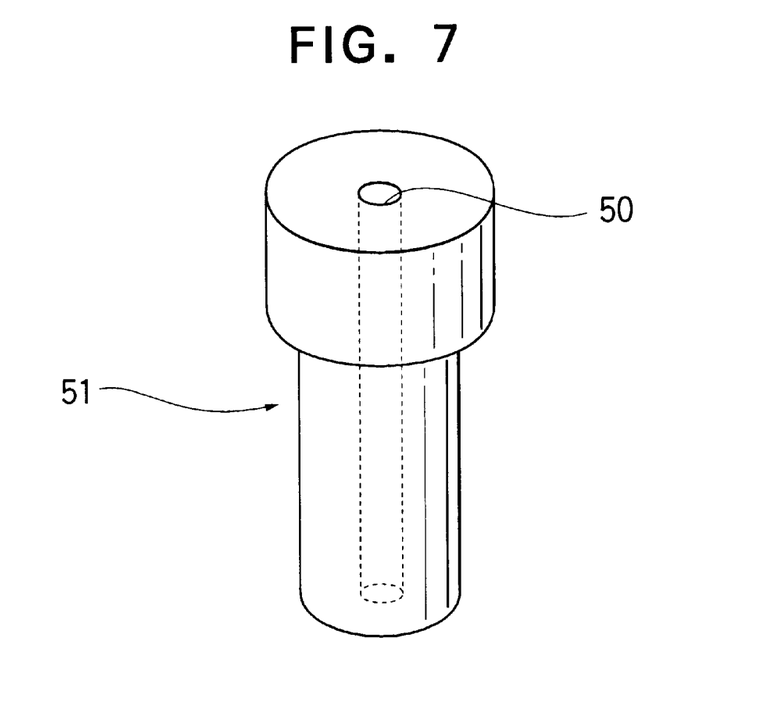
FIG. 7 is a schematic perspective view of a socket.

As shown in FIG. 6, the terminal 46 of the CCD 41 and the connector terminals 47 are respectively connected to predetermined portions of the substrate 45 via sockets 51 each having an aperture 50. Each of the sockets 51 is fixed in a hole 52 formed in the substrate 45. FIG. 7 is a schematic perspective view of the socket 51. Before assembly, the terminals 46 of the CCD 41 and the connector terminals 47 are movable within the apertures 50 of the sockets 51. During assembly, they are fixed to the sockets 51 at positions determined depending on the thickness of members such as the heat transfer plate 42, the Peltier element 43 and the substrates 45.

Figure 8:
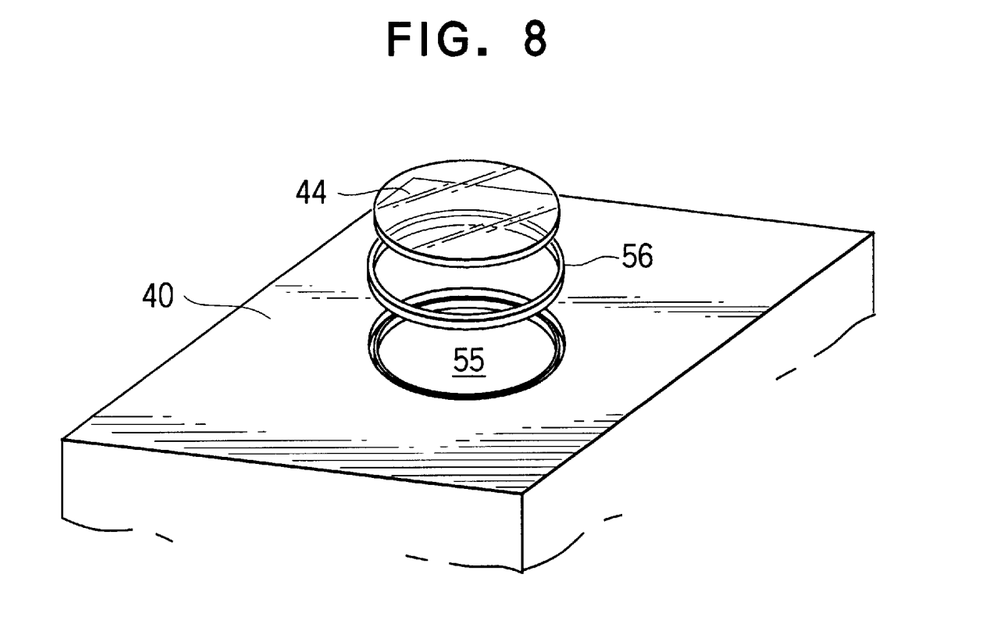
FIG. 8 is a schematic exploded view for showing a method for mounting an optical glass plate on a package and hermetically sealing it.

FIG. 8 is a schematic exploded view for explaining a method for mounting the optical glass plate 44 on the package 40 and hermetically sealing it.

As shown in FIG. 8, a low-melting-point glass ring 56 and a disk-like optical glass plate 44 having an outer diameter slightly smaller than the inner diameter of the low melting point glass ring 56 are fitted in an opening 55 formed in the upper surface of the package 40 and the optical glass plate 44 is fused to the opening 55 of the package 40 by melting the low melting point glass ring 56 with heat.

Figure 9:
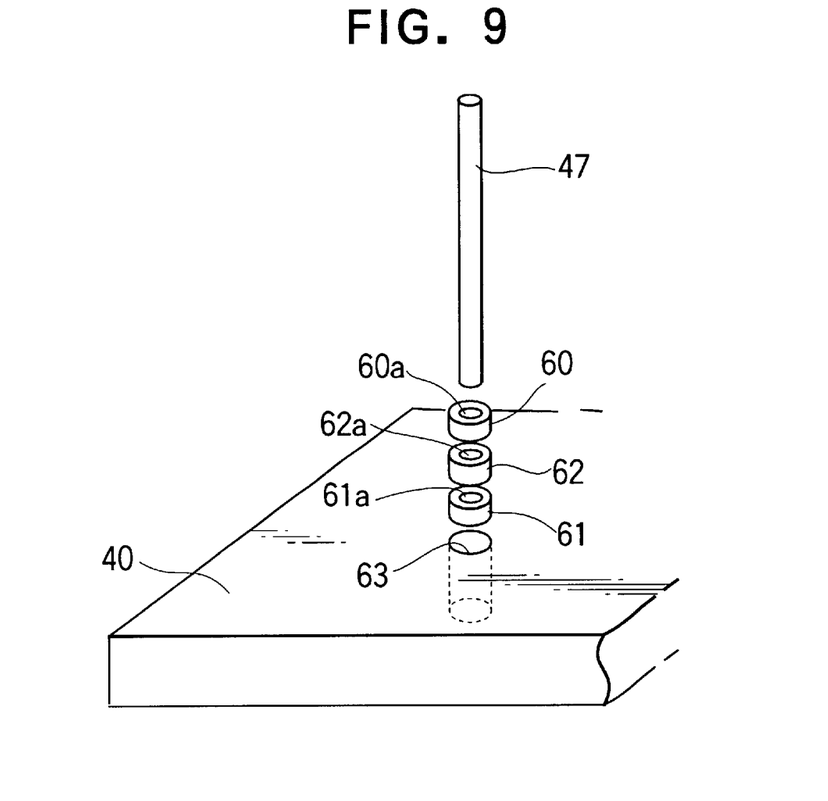
FIG. 9 is a schematic exploded view for showing a method for mounting a connector terminal on a package and hermetically sealing it.

FIG. 9 is a schematic exploded view for explaining a method for mounting the connector terminal 47 on the package 40 and hermetically sealing it.

As shown in FIG. 9, the connector terminal 47 is inserted into holes formed in a pair of low melting point glass rings 60, 61 and a spacer 62 positioned therebetween and is further inserted into a hole 63 formed in the lower surface of the package 40 and having an inner diameter slightly greater than the outer diameters of the low melting point glass rings 60, 61 and the spacer 62. The connector terminal 47 is then fused to the hole 63 of the package 40 by melting the low melting point glass rings 60, 61 with heat.

The image producing apparatus including the cooled CCD camera 6 according to this embodiment is adapted to detect fluorescent light emitted from an image carrier carrying an image of a fluorescent substance and chemiluminescence emission generated by contacting a chemiluminescent substance with a labeling substance and produce a fluorescent image and a chemiluminescent image.

In the case where a fluorescent image is to be produced, fluorescent light from the image carrier carrying an image of a fluorescent substance is detected and a visual image is produced in the following manner. As termed in this specification, an image carrier carrying an image of a fluorescent substance includes an image carrier carrying an image of a specimen labeled with a fluorescent substance and an image carrier carrying an image of a fluorescent substance obtained by combining enzyme with a labeled specimen, contacting the enzyme and a fluorescent substrate, thereby changing the fluorescent substrate to a fluorescent substance capable of emitting fluorescent light.

An image carrier 18, which is a specimen, is first placed on the filter 24 and the lens focus is adjusted by the user. After the dark box 2 has been closed, the user inputs an exposure start signal through the keyboard 5. The first blue light emitting diode stimulating ray source 21 alone or the second blue light emitting diode stimulating ray source 22 and the third blue light emitting diode stimulating ray source 23 are turned on by the light source control means 35, thereby emitting a stimulating ray toward the image carrier 18. At the same time, the exposure start signal is input through the CPU 30 to the camera controlling circuit 9 of the imaging device 1 and the shutter 11 is opened by the camera controlling circuit 12, thereby starting the exposure of the CCD 41.

Light components of wavelengths not in the vicinity of 450 nm are cut by the filters 24, 25, 26 from the stimulating rays emitted from the first blue light emitting diode stimulating ray source 21 alone or the second blue light emitting diode stimulating ray source 22 and the third blue light emitting diode stimulating ray source 23. As a result, the fluorescent substance contained in the image carrier 18 is stimulated by light having a wavelength in the vicinity of 450 nm, thereby emitting fluorescent light.

The fluorescent light emitted from the fluorescent substance contained in the image carrier 18 enters the photo-electrical surface of the image intensifier 12 via the filter 27 and the camera lens 13 and is amplified so that an image is formed on the fluorescent surface of the image intensifier 12. The CCD 41 of the imaging device 1 receives light from the image formed on the fluorescent surface of the image intensifier 12 to convert the energy of the light to electric charges and accumulates them. Since light components having wavelengths in the vicinity of 450 nm are cut by the filter 27, only fluorescent light emitted from the fluorescent substance contained in the image carrier 18 is received by the CCD 41 of the imaging device 1.

When a predetermined exposure time has passed, the CPU 30 outputs an exposure completion signal to the camera control circuit 9 of the imaging device 1. When the camera control circuit 9 receives the exposure completion signal, it transfers the analog image data accumulated in the CCD 41 of the cooled CCD camera 6 in the form of charge to the A/D converter 7 in response to a control signal from the CPU 30 to cause the A/D converter 7 to digitize the image data and temporarily store the thus digitized image data in the image data buffer 8. At the same time, the CPU 30 outputs a data transfer signal to the image data transferring means 31 to cause it to read out the digital image data temporarily stored in the image data buffer 11 of the imaging device 1 and to input them to the image processing means 33. The image processing means 33 effects image processing on the image data input from the image data transferring means 31 and stores them in the image data storing means 32.

Afterward, when the user inputs an image production signal through the keyboard 5, the image displaying means 34 reads out the image data stored in the image data storing means 32 and a fluorescent image is displayed on the screen of the CRT display 4 based on the read out image data.

A chemiluminescent image is produced in the same manner as a fluorescent image except that the filter 27 is removed and the first blue light emitting diode stimulating ray source 21, the second blue light emitting diode stimulating ray source 22 and the third blue light emitting diode stimulating ray source 23 are kept to be off, a specimen 18 capable of emitting chemiluminescent emission is placed on the filter 24, chemiluminescent emission emitted from the specimen 18 is photoelectrically detected. Namely, chemiluminescent emission emitted from the specimen 18 is photoelectrically detected by the CCD 41 via the camera lens 13 and the image intensifier 12 to produce image data and a chemiluminescent image is displayed on the screen of the CRT display 4.

According to the above described embodiment, the optical glass plate 44 forming a light incident window and the connector terminals 47 for connecting to the outside are airtightly mounted on the package 40 by sealing with glass having a low melting point from 400 to 450° C. Therefore, since the airtight package 40 of the cooled CCD camera 6 can be formed of aluminum alloy having a much higher heat transfer coefficient than that of the material for the conventional airtight package 40 such as stainless steel and Kovar, the cooling efficiency can be markedly improved, thereby preventing drop-like condensation on the optical glass plate without any additional means such as a heater and, therefore, the structure of the cooled CCD camera 6 can be simplified. Further, since the optical glass plate 44 and the connector terminals 47 for connecting to the outside can be airtightly mounted on the package 40 without need for high-temperature welding or vacuum brazing, the cooled CCD camera can be easily assembled. Moreover, according to the above described embodiment, before assembly, the terminals 46 of the CCD 41 and the connector terminals 47 are movable within the apertures 50 of the sockets 51, while, during assembling, they are fixed to the sockets 51 at positions determined depending on the thickness of members such as the heat transfer plate 42, the Peltier element 43 and the substrates 45 and thus connected to the substrate 45. Therefore, even when the thickness of a member such as the CCD 41, the heat transfer plate 42, the Peltier element 43 and the substrates 45 differs somewhat from the specifications, these members can be easily assembled to produce the cooled CCD camera 6 with properly aligned optic axis.

The present invention has thus been shown and described with reference to specific embodiments. However, it should be noted that the present invention is in no way limited to the details of the described arrangements but changes and modifications may be made without departing from the scope of the appended claims.

For example, although in the above described embodiment both the terminals of the CCD 41 and the connector terminals 47 are connected to the substrates 45 via the sockets 51, it is alternatively possible to connect only the terminals of the CCD 41 or only the connector terminals 47 to the substrates 45 via the sockets 51.

Further, in the above described embodiment, although the image intensifier 12 is provided in front of the imaging device 1, it is not absolutely necessary to provide the image intensifier 12.

Furthermore, in the above described embodiment, although the first blue light emitting diode stimulating ray source 21, the second blue light emitting diode stimulating ray source 22 and the third blue light emitting diode stimulating ray source 23 are provided in the dark box 2, only the first blue light emitting diode stimulating ray source 21, or only the second blue light emitting diode stimulating ray source 22 and the third blue light emitting diode stimulating ray source 23 may be provided.

Further, in the above described embodiment, blue light emitting diode stimulating ray sources 21, 22, 23 adapted to emit stimulating rays whose center wavelength is 450 nm are used, a light emitting diode stimulating ray source for emitting light whose center wavelength is in the range between 400 and 700 nm may be employed depending on the kind of fluorescent substance.

Furthermore, in the above described embodiment, when an exposure start signal is input through the keyboard 5, the first blue light emitting diode stimulating ray source 21 alone or the second blue light emitting diode stimulating ray source 22 and the third blue light emitting diode stimulating ray source 23 are turned on by the light source control means 35. However, it is not absolutely necessary to constitute the light source control means 35 so as to be controlled by the personal computer 3 and the light source control means 35 may be manually operated.

Moreover, in the above described embodiment, the filter 27 for cutting light having a wavelength in the vicinity of 450 nm is detachably mounted on the front surface of the camera lens 13 and the image producing apparatus is constituted so as to be able to detect extremely weak chemiluminescent emission and produce a chemiluminescent image when the filter 27 is removed. However, the image producing apparatus may be constituted so as to produce only a fluorescent image by the fluorescent detection system, in which case the filter 27 can be fixed to the front surface of the camera lens 13.

Further, in the above described embodiment, although the first blue light emitting diode stimulating ray source 21, the second blue light emitting diode stimulating ray source 22 and the third blue light emitting diode stimulating ray source 23 are provided, it is unnecessary to provide the first blue light emitting diode stimulating ray source 21, the second blue light emitting diode stimulating ray source 22 and the third blue light emitting diode stimulating ray source 23 and also filters 24, 25, 26, 27 in the case where an image producing apparatus is used only for detecting chemiluminescence emission and producing a chemiluminescent image.

Moreover, in the above described embodiment, although the imaging device 1 is formed with heat dispersion fins 10 over substantially half its length for dispersing heat released from the Peltier element 43, it is possible to form the heat dispersion fins 10 on the periphery of the CCD camera 1 over its entire length and the arrangement of the heat dispersion fin 10 on the periphery of the imaging device 1 may be arbitrarily determined.

According to the present invention, it is possible to provide a cooled CCD camera of simple structure that is easy to mount and has improved cooling efficiency.

What is claimed is:

1. A cooled CCD camera comprising a CCD, a heat transfer plate, a cooling element for cooling the CCD, a substrate on which electronic parts are mounted and an airtight package for accommodating them, the package being made of aluminum alloy, an optical glass plate being airtightly mounted on the package by sealing with glass having a melting point from 400 to 450° C. and connector terminals for connecting the CCD to an outside being airtightly mounted on the package by sealing with glass having a melting point from 400 to 450° C.

2. A method for constructing a cooled CCD camera, comprising the steps of:

providing a package made of aluminum alloy;

fitting a disk shaped optical glass plate and a first glass ring onto an opening formed on an upper surface of the package, wherein an outer diameter of the glass plate is smaller than an inner diameter of the first glass ring;

fusing the optical glass plate to the opening by melting the first glass ring with heat;

inserting a connector terminal into a second and third glass rings and a spacer, wherein the spacer is disposed between the second and third glass rings;

inserting the connector terminal, having the second and third glass rings and spacer fitted thereon, into an opening formed on a lower surface of the package, wherein an inner diameter of the opening on the lower surface is greater than an outer diameter of the second and third glass rings and the spacer;

fusing the connector terminal to the hole of the lower surface of the package by melting the glass rings with heat, wherein said glass rings have a melting point from 400 to 450° C.

* * * * *